(12) United States Patent
Tian et al.

(10) Patent No.: US 12,067,085 B2
(45) Date of Patent: Aug. 20, 2024

(54) METHOD AND APPARATUS FOR DETERMINING LOCK TYPE

(71) Applicant: ABB Schweiz AG, Baden (CH)

(72) Inventors: Ye Tian, Shanghai (CN); Yichao Mao, Zhejiang (CN); Jiafan Zhang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 215 days.

(21) Appl. No.: 17/635,352

(22) PCT Filed: Aug. 14, 2019

(86) PCT No.: PCT/CN2019/100562
§ 371 (c)(1),
(2) Date: Feb. 14, 2022

(87) PCT Pub. No.: WO2021/026807
PCT Pub. Date: Feb. 18, 2021

(65) Prior Publication Data
US 2022/0277603 A1   Sep. 1, 2022

(51) Int. Cl.
*G06F 18/24* (2023.01)
*G06F 18/2415* (2023.01)
*G07C 9/00* (2020.01)

(52) U.S. Cl.
CPC .......... *G06F 18/24* (2023.01); *G06F 18/2415* (2023.01); *G07C 9/00563* (2013.01)

(58) Field of Classification Search
CPC .. G06F 18/24; G06F 18/2415; G07C 9/00563
See application file for complete search history.

(56) References Cited

U.S. PATENT DOCUMENTS 11,176,189 B1 * 11/2021 Hohwald ............. G06F 16/5866
2015/0294483 A1 * 10/2015 Wells ..................... G06V 20/52
382/103

(Continued)

FOREIGN PATENT DOCUMENTS

CN   105035581 A   11/2015
CN   205114175 U   3/2016

(Continued)

OTHER PUBLICATIONS

Shaung Ma, Changjiu Zhou, Liandong Zhang, Wei Hong, Yantao Tian; "3D irregular object recognition for twist-lock handling system", The 26th Chinese Control and Decision Conference (2014 CCDC), Changsha, China, 2014, pp. 2729-2734, doi: 10.1109/CCDC.2014.6852635 (Year: 2014).*

(Continued)

*Primary Examiner* — Henry Tsai
*Assistant Examiner* — Harry Z Wang
(74) *Attorney, Agent, or Firm* — Greenberg Traurig, LLP

(57) ABSTRACT

Method for determining a lock type of a lock device. In the method, a group of raw data of a group of lock devices is collected from a group of sensors respectively. Here the group of lock devices are respectively mounted to an object at a group of positions, and the group of lock devices belong to at least one lock type of a plurality of lock types. A group of probability distributions are obtained based on the group of raw data. Here a probability distribution in the group of probability distributions is associated with a lock device in the group of lock devices and probabilities of lock types to which the lock device belongs. A lock type of the lock device is determined based on the group of probability distributions.

21 Claims, 5 Drawing Sheets

(56) References Cited

U.S. PATENT DOCUMENTS

| | | | | |
|---|---|---|---|---|
| 2016/0247021 A1* | 8/2016 | Yamamoto | ............ | B25J 9/1697 |
| 2017/0251985 A1* | 9/2017 | Howard | ................ | G16H 70/60 |
| 2018/0164788 A1* | 6/2018 | Shimamura | ............ | B25J 9/0093 |
| 2019/0147220 A1* | 5/2019 | McCormac | ............ | G06V 20/41 |
| | | | | 382/103 |
| 2019/0380238 A1* | 12/2019 | Yokoi | ................ | H05K 13/0813 |
| 2021/0147192 A1* | 5/2021 | Klement | ............. | G05D 1/0246 |

FOREIGN PATENT DOCUMENTS

| | | |
|---|---|---|
| CN | 109319317 A | 2/2019 |
| CN | 109740601 A | 5/2019 |
| CN | 208840819 U | 5/2019 |
| DE | 202018102649 U1 | 7/2018 |
| WO | 2012141658 A2 | 10/2012 |

OTHER PUBLICATIONS

Kunze et al. "Combining top-down spatial reasoning and bottom-up object class recognition for scene understanding", Sep. 2014, IEEE/RSJ International Conference on Intelleigent Robots and Systems, p. 2910-2915.

Ma et al. "3D irregular object recognition for twist-lock handling system", May 2014, The 26th Chinese Control and Decision Conference, IEEE, p. 2729-2734.

Ma et al. "Depth image denoising and key points extraction for manipulation plane detection", Jun. 2014, Proceeding of the 11th World Congress on Intelligent Control and Automation, IEEE, p. 3315-3320.

Eduardo et al. "Cooperative Object Classification for Driving Applications", Jun. 2019, 2019 IEEE Intelligent Vehicles Symposium (IV), IEEE, p. 2484-2489.

International Search Report and Written Opinion, issued by the ISA/CN National Intellectual Property Administration PCR, regarding corresponding patent application Serial No. PCT/CN2019/100562; dated May 11, 2020; 9 pages.

Marin et al., "Bayesian Core: A Practical Approach to Computational Bayesian Statistics", Lawrence Joseph, McGill University, Department of Epidemiology and Biostatistics, Montreal, Quebec, Canada, Book Reviews, Sep. 2007, Biometrics vol. 63, No. 3 p. 975-976.

* cited by examiner

METHOD AND APPARATUS FOR DETERMINING LOCK TYPE

CROSS-REFERENCE TO RELATED APPLICATIONS

This is a national stage application which claims priority to International patent application Serial No.: PCT/CN2019/100562, filed on Aug. 14, 2019; and which is herein incorporated by reference in its entirety.

FIELD

Example embodiments of the present disclosure generally relate to type determination, and more specifically, to methods, apparatuses, computer systems, computer readable media, and systems for determining a lock type of a lock device for securing a container object.

BACKGROUND

Nowadays, shipping service plays important role in people's daily life. Countless containers are loaded on ships and delivered all around the world every day. In order to ensure that containers may maintain relative still during shipment, a plurality of containers are secured together by using lock devices (such as twist locks). As the lock devices are usually owned by shipping companies, when the containers arrive at their destination, it needs to unload the containers from the ship and remove all the lock devices from the containers.

There have been proposed several solutions for removing the lock devices by robot systems. However, different types of lock devices should be removed in different ways, and thus it is necessary to first determine lock types of the lock devices before being removed. At present, human workers are employed to determine the lock types, and thus it leads to a high cost in time and human resources. Further, even experienced workers make mistakes due to deformation and erosion of the lock devices. Therefore, it is desired to determine the lock type of the lock device in a more effective and convenient manner.

SUMMARY

Example embodiments of the present disclosure provide solutions for determining a lock type of a lock device.

In a first aspect, example embodiments of the present disclosure provide a method for determining a lock type of a lock device. The method comprises: collecting a group of raw data of a group of lock devices from a group of sensors respectively, the group of lock devices being respectively mounted to an object at a group of positions, the group of lock devices belonging to at least one lock type of a plurality of lock types; obtaining a group of probability distributions based on the group of raw data, a probability distribution in the group of probability distributions being associated with a lock device in the group of lock devices and probabilities of lock types to which the lock device belongs; and determining a lock type of the lock device based on the group of probability distributions. With these embodiments, the lock type of the lock device may be determined in an automatic way based on raw data collected from a group of sensors without manual intervention, therefore performance and accuracy may be greatly increased compared with human operations. Further, as a container object is usually secured with the same type of lock devices, determining the lock type based on a group of raw data of a group of lock devices may eliminate potential errors caused by deformation and erosion of the lock devices.

In some embodiments of the present disclosure, the lock device comprises a twist lock and the object comprises a container. Moreover, a robot system may be instructed to remove the lock device from the object based on the lock type. Usually, large ships carry thousands of containers at one time, and thus countless twist locks are required for securing these containers together. With these embodiments, lock types may be automatically identified and then the lock devices may be removed by robot systems during an unloading procedure without any manual intervention. Further, the number of human workers may be significantly decreased and efficiency of the unloading procedure may be greatly increased.

In some embodiments of the present disclosure, a sensor in the group of sensors comprises an image measurement camera, and the raw data comprises image data of the lock device. In these embodiments, the sensor such as a 2D camera may be adapted for collecting image data of the lock device. Further, the collected image data may be used for further processing to determine the lock type to which the lock device belongs. Nowadays, 2D cameras are cheap and widely used for monitoring the unloading procedure, and thus these embodiments provide effective and efficient solutions for reusing the sensors.

In some embodiments of the present disclosure, a sensor in the group of sensors comprises a dimension measurement camera, and the raw data comprises dimension data of the lock device. With these embodiments, the sensor such as a 3D camera may be adapted for collecting the dimension of the lock device. Specifically, a laser device in the 3D camera may measure distances between the laser device and almost every point on a surface of the lock device. Therefore, point cloud data of the lock device may be collected for determining the dimension and shape of the lock device. Next, the dimension and shape may be used independently or together with the image data for determining the probability distributions. Although the 3D camera is more expensive compared with the 2D camera, the 3D camera may provide more information about the lock device, which in turn may provide higher accuracy in determining the lock type.

In some embodiments of the present disclosure, obtaining the group of probability distributions based on the group of raw data comprises: with respect to a given lock device in the group of lock devices, determining, based on given raw data associated with the given lock device in the group of raw data, probabilities of lock types to which the given lock device belongs; and obtaining a probability distribution in the group of probability distribution based on the determined probabilities. Here, each lock device may have a corresponding probability distribution, which represents probabilities of lock types to which the lock device may possibly belong. For example, if there are m lock types, a lock device j may belong to any of lock Type 1, Type 2, . . . , and Type m. At this point, the probability distribution for the lock device j may be represented as a vector of $(p_{j,1}, p_{j,2}, \ldots, p_{j,m})$. With these embodiments, as the group of probability distributions are determined based on the group of raw data for all the lock devices, the group of probability distributions may represent a reliable ground for determining the lock type to which the lock device belongs.

In some embodiments of the present disclosure, wherein determining the probabilities of the lock types comprises: with respect to a given lock type in the lock types, a probability of the given lock type is determined by an image recognition procedure based on the given raw data. In some embodiments of the present disclosure, a probability of the given lock type is determined by a machine learning procedure based on the given raw data. Nowadays, developments of image recognition and other techniques such as machine learning provide effective solutions for type determination, meanwhile probabilities of whether the determination is can be trusted is provided. The higher the probability is, the more accurate the determination is recognized. With these embodiments, the probability of the lock type may be provided based on a solid ground for image recognition and/or machine learning, therefore the lock type may be determined in an accurate way.

In some embodiments of the present disclosure, the method further comprises selecting the group of lock devices from a plurality of lock devices that are mounted to the object based on relative positions between the plurality of lock devices and the object. Usually, lock devices for securing a single container object at similar positions are of the same lock type. With these embodiments, lock devices mounted at similar positions of the container may be selected into the same group, such that lock devices in the selected group may provide more information about the lock type.

In some embodiments of the present disclosure, the relative positions comprise at least one of a corner position and a middle position. Containers may be secured with different types of lock devices. For a long-size container, lock devices at four corner positions are of the same type. For short-size containers, a total length of two short-size containers equals to a length of the long-size container, accordingly two short-size containers may be connected together with different lock devices at their length direction to combine into a long-size container. Therefore, lock types of lock devices mounted at the middle position of the combined container may be of a different type. With these embodiments, by dividing the lock devices into different groups based on the corner position and the middle position, lock devices in a single group may be of the same lock type and thus increase the accuracy in determining the lock type.

In some embodiments of the present disclosure, determining the lock type of the lock device comprises: generating a probability list based on a comparison between values in the group of probability distributions that are associated with a target lock type and values in the group of probability distributions that are associated with the plurality of lock types; and determining the lock type of the lock device based on the generated probability list. With these embodiments, raw data from all the lock devices in the same group may be considered in generating the probability list, and thus the probability list may reflect all the probability of lock types to which the lock device possibly belongs.

In some embodiments of the present disclosure, determining the lock type of the lock device based on the generated probability list comprises: in response to a highest probability in the probability list being above a predefined threshold, identifying the lock type of the lock device as a lock type corresponding to the highest probability. With these embodiments, the threshold may be determined in advance for representing a reliable standard. If the highest probability is above the threshold, it may indicate that the lock type corresponding to the highest probability is reliable and acceptable; otherwise the lock type corresponding to the highest probability may be discarded. In these embodiments, only reliable lock types may be output for further control the robot system to remove the lock device.

In some embodiments of the present disclosure, the method further comprises: in response to the greatest probability in the probability list being below a predefined threshold, providing an alarm for indicating a potential error. With these embodiments, unreliable lock type may be prevented from being output. In this situation, the above method may be restarted for another round of lock type determination until a reliable lock type is determined.

In a second aspect, example embodiments of the present disclosure provide an apparatus determining a lock type of a lock device. The apparatus comprises: a collecting unit configured to collect a group of raw data of a group of lock devices from a group of sensors respectively, the group of lock devices being respectively mounted to an object at a group of positions, the group of lock devices belonging to at least one lock type of a plurality of lock types; an obtaining unit configured to obtain a group of probability distributions based on the group of raw data, a probability distribution in the group of probability distributions being associated with a lock device in the group of lock devices and probabilities of lock types to which the lock device belongs; and a determining unit configured to determine a lock type of the lock device based on the group of probability distributions.

In some embodiments of the present disclosure, the obtaining unit is further configured to: with respect to a given lock device in the group of lock devices, determine, based on given raw data associated with the given lock device in the group of raw data, probabilities of lock types to which the given lock device belongs; and obtain a probability distribution in the group of probability distribution based on the determined probabilities.

In some embodiments of the present disclosure, the obtaining unit is further configured to: with respect to a given lock type in the lock types, determine a probability of the given lock type based on any of: an image recognition procedure based on the given raw data; and a machine learning procedure based on the given raw data.

In some embodiments of the present disclosure, the determining unit is further configured to: generate a probability list based on a comparison between values in the group of probability distributions that are associated with a target lock type and values in the group of probability distributions that are associated with the plurality of lock types; and determine the lock type of the lock device based on the generated probability list.

In some embodiments of the present disclosure, the determining unit is further configured to: in response to a highest probability in the probability list being above a predefined threshold, identify the lock type of the lock device as a lock type corresponding to the highest probability; and in response to the highest probability in the probability list being below a predefined threshold, provide an alarm for indicating a potential error.

In some embodiments of the present disclosure, the apparatus further comprises: a selecting unit configured to select the group of lock devices from a plurality of lock devices that are mounted to the object based on relative positions between the plurality of lock devices and the object.

In some embodiments of the present disclosure, the relative positions comprise at least one of a corner position and a middle position.

In some embodiments of the present disclosure, the lock device comprises a twist lock and the object comprises a container, and the apparatus further comprises: an instructing unit configured to instruct a robot system to remove the lock device from the object based on the type of the lock device.

In some embodiments of the present disclosure, a sensor in the group of sensors comprises a dimension measurement camera, and the raw data comprises dimension data of the lock device.

In some embodiments of the present disclosure, a sensor in the group of sensors comprises an image measurement camera, and the raw data comprises image data of the lock device.

In a third aspect, example embodiments of the present disclosure provide a computer system for determining a lock type of a lock device. The computer system comprises: a computer processor coupled to a computer-readable memory unit, the memory unit comprising instructions that when executed by the computer processor implements the method for determining a lock type of a lock device according to a first aspect of the present disclosure.

In a fourth aspect, example embodiments of the present disclosure provide a computer readable medium having instructions stored thereon, the instructions, when executed on at least one processor, cause the at least one processor to perform the method determining a lock type of a lock device according to a first aspect of the present disclosure.

In a fifth aspect, example embodiments of the present disclosure provide a system for determining a lock type of a lock device. The system comprises: a group of sensors for collecting a group of raw data of a group of lock devices; and a computer system according to the third aspect of the present disclosure.

DESCRIPTION OF DRAWINGS

Throughout the drawings, the same or similar reference symbols are used to indicate the same or similar elements.

DETAILED DESCRIPTION OF EMBODIMENTS

Figure 1:
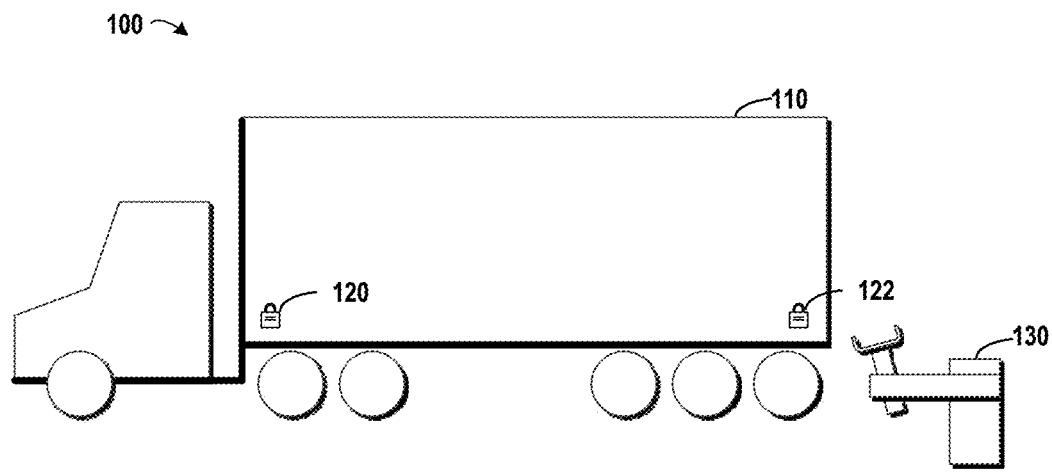
FIG. 1 illustrates a schematic diagram of a working environment in which embodiments of the present disclosure may be implemented.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1 to provide a general description of environment of the embodiments. FIG. 1 illustrates a schematic diagram of a working environment 100 in which embodiments of the present disclosure may be implemented. In the context of the present disclosure, embodiments will be described by taking a container as an example of an object on which multiple lock devices are mounted. Specifically, in FIG. 1, an object 110 (such as a container) is unloaded from a ship and lock devices 120 and 122 are still mounted to the container. First, lock types of the lock devices 120 and 122 may be determined and then the lock devices 120 and 122 may be removed by a robot system 130 based on the determined lock type.

Currently, human workers check the lock devices one by one and determine the lock types. On one hand, great costs are involved for hiring human workers; on the other hand, even experienced workers make mistakes due to deformation and erosion of the lock devices during the long-time usage. Therefore it is desired to determine the lock type of the lock device in a more effective and convenient manner.

Figure 2:
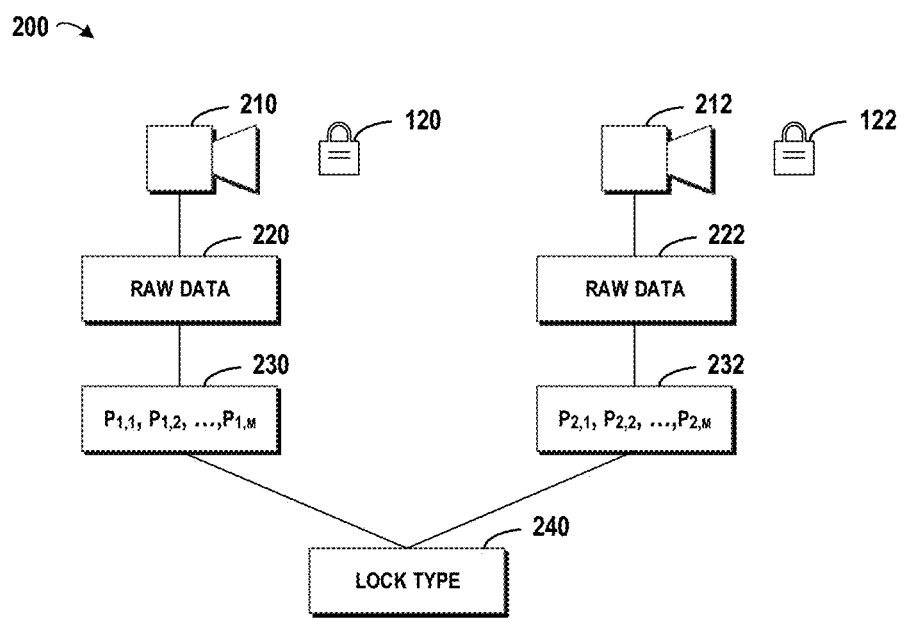
FIG. 2 illustrates a schematic diagram for determining a lock type in according with embodiments of the present disclosure.

Reference will be made to FIG. 2 for more details about how to determine the lock type of the lock device. FIG. 2 illustrates a schematic diagram 200 for determining a lock type in according with embodiments of the present disclosure. In FIG. 2, a group of sensors 210 and 212 may be equipped for collecting raw data of the lock devices 120 and 122, respectively. For example, the sensor 210 may collect raw data 220 and the sensor 212 may collect raw data 222. The raw data here may be in various formats such as image data, point cloud data, or a combination of them. The lock devices 120 and 122 may be respectively mounted to the object 110 at a group of positions. Here, the group of lock devices may belong to at least one lock type of a plurality of lock types.

Further, a group of probability distributions may be obtained based on the group of raw data. In FIG. 2, a probability distribution 230 is obtained from the raw data 220, and a probability distribution 232 is obtained from the raw data 222, respectively. Here, the probability distribution 230 is associated with the lock device 120 and probabilities of lock types to which the lock device 120 belongs. The probability distribution 232 is associated with the lock device 122 and probabilities of lock types to which the lock device 122 belongs. Next, the lock type 240 of the lock device may be determined based on the probability distributions 230 and 232. With these embodiments, the lock type 240 of the lock device may be determined in an automatic way based on the raw data 220 and 222 without manual intervention, and thus performance and accuracy may be greatly increased compared with human operations. Although only two lock devices are shown in FIG. 2, in another example, the group may include more lock devices.

Figure 3:
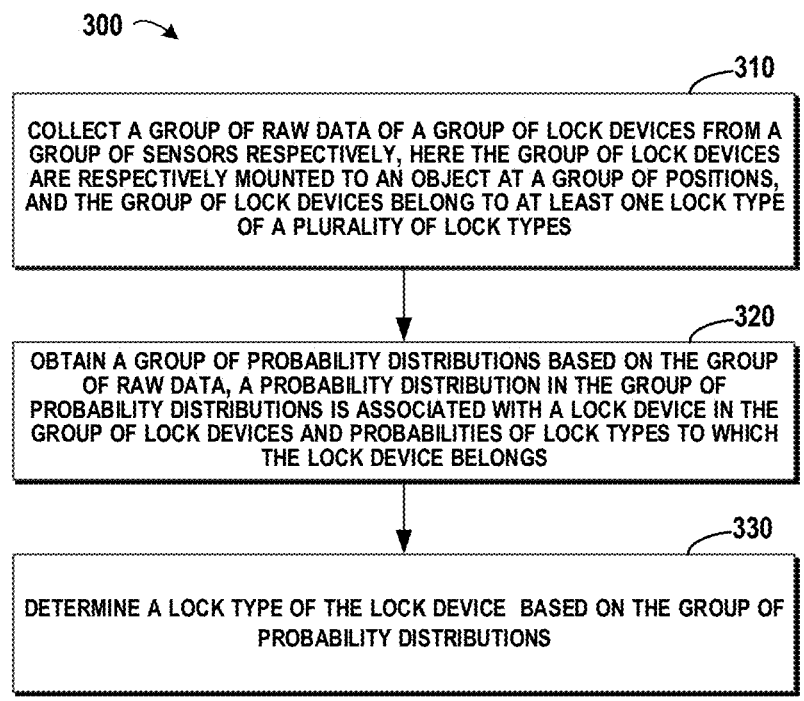
FIG. 3 illustrates a flowchart of a method for determining a lock type in accordance with embodiments of the present disclosure.

Details of the present invention will be provided with reference to FIG. 3, which illustrates a flowchart of a method 300 for determining a lock type of a lock device in accordance with embodiments of the present disclosure. At a block of 310, a group of raw data of a group of lock devices is obtained from a group of sensors respectively. For example, each sensor may collect raw data of one lock device. For another example, the sensor may be moved to another position for collecting raw data of another lock device. The group of lock devices may be respectively mounted to the object 110 at a group of positions. Referring back to FIG. 1, the lock device 120 is mounted to the left corner of the object 110, and the lock device 122 is mounted to the right corner of the object 110.

In some embodiments of the present disclosure, the lock devices 120 and 122 may comprise a twist lock and the object 110 may comprise a container. Here, the lock devices 120 and 122 may be used to connect the container and other containers during shipment. After these containers are unloaded from the ship, the lock devices 120 and 122 should be removed from the container. With these embodiments, the lock types may be automatically determined and further the robot system 130 may be instructed to remove the lock devices 120 and 122 from the object 110 based on the type of the lock device.

It is to be understood that, embodiments of the present disclosure may be very efficient especially in a port for unloading containers from ships. Usually, large ships carry thousands of containers, such that countless twist locks are required for securing these containers together. With these embodiments, lock types can be automatically identified and then the lock devices may be removed without any manual intervention. Further, the number of human workers may be significantly decreased and efficiency of the unloading procedure may be increased.

Usually, various types of lock devices may be used for connecting the containers. Here, the group of lock devices may belong to at least one lock type of a plurality of lock types, and the number of the lock types may be determined in advance. In one example, the number of the lock types may be represented by an integer m, and thus the lock types may be represented by Type 1, Type 2, . . . , and Type m. Further, the number of the lock devices in the group may be represented by an integer n, and thus the lock devices may be represented by Lock 1, Lock 2, . . . , and Lock n.

As the procedures for collecting raw data from all the sensors are the same, the following paragraphs will provide detailed procedures by taking the sensor 210 as an example. In some embodiments of the present disclosure, the sensor 210 may comprise an image measurement camera such as a 2D image camera, and the raw data 220 may comprise image data of the lock device 120. Referring to FIG. 2, the sensor 210 may be 2D image cameras. With these embodiments, the collected image data may be used for further processing to determine the lock type to which the lock device 120 belongs. Nowadays, 2D cameras are cheap and widely used for monitoring the unloading procedure, therefore these embodiments provide effective and efficient solutions for reusing the sensors.

Figure 4:
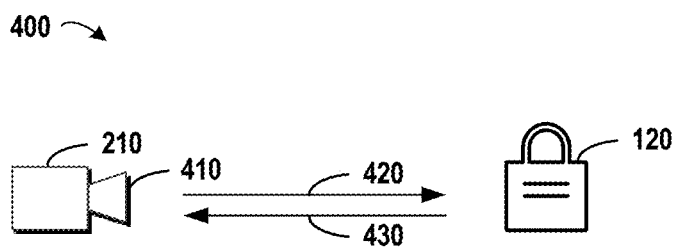
FIG. 4 illustrates a schematic diagram for obtaining a dimension of a lock device in accordance with embodiments of the present disclosure.

Other than the 2D cameras, 3D camera devices may be adopted for collecting the raw data. In some embodiments of the present disclosure, the sensor 210 may comprise a dimension measurement camera such as a 3D image camera, and the raw data 220 may comprise dimension data of the lock device 120. With these embodiments, the sensor 210 such as a 3D camera may be adapted for collecting the dimension of the lock device 120. Specifically, a laser device in the 3D camera may measure distances between the laser device and almost every point on a surface of the lock device 120. Reference will be made to FIG. 4 for details, which figure illustrates a schematic diagram 400 for obtaining a dimension of a lock device in accordance with embodiments of the present disclosure.

In FIG. 4, the sensor 210 may be equipped with a laser device 410 for measuring dimensions of the lock device 120. During operations of the sensor 210, the laser device 410 may transmit a signal 420 (such as a laser beam) towards the lock device 120. The signal 420 may reach a point on the surface of the lock device 120 and then a signal 430 may be reflected by the lock device 120. The sensor 210 may receive the reflected signal 430 and determine the distance between the laser device 410 and the point in the surface based on a time duration between time points for transmitting the signal 420 and receiving the signal 430.

With the above procedure, point cloud data of the lock device 120 may be collected for determining dimension and shape of the lock device 120. The dimension and shape date may be used independently or together with the image data for determining the probability distribution 230. Although the 3D camera is more expensive compared with the 2D camera, the 3D camera may provide more information about the lock device 120, which in turn may provide higher accuracy in determining the lock type 240.

In some embodiments of the present disclosure, the group of lock devices 120 and 122 may be selected from a plurality of lock devices that are mounted to the object 110 based on relative positions between the plurality of lock devices and the object 110. Usually, lock devices for securing a single container at similar positions belong to the same lock type. Referring back to FIG. 1, the object 110 is a long-size container and four lock devices are used for securing purpose. Although FIG. 1 shows only two lock devices 120 and 122 at one side of the container, two other lock devices are mounted to the container at the hidden side of the container. At this point, the four lock devices mounted at the four corners of the container may be selected. With these embodiments, lock devices mounted at similar positions of the container may be selected into a same group, such that lock devices in the selected group may provide more information about the lock type.

Figure 5:
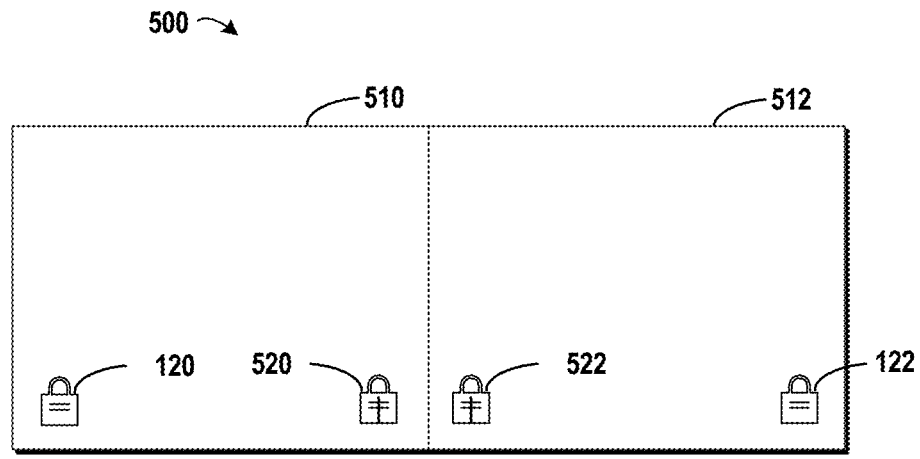
FIG. 5 illustrates a schematic diagram for dividing a plurality of lock devices into groups in accordance with embodiments of the present disclosure.

In some embodiments of the present disclosure, the relative positions comprise at least one of a corner position and a middle position. Usually, containers may be secured with different types of lock devices. For a long-size container, lock devices at four corner positions are of the same type. Reference will be made to FIG. 5 for short-size containers, which figure illustrates a schematic diagram 500 for dividing a plurality of lock devices into groups in accordance with embodiments of the present disclosure. As shown in FIG. 5, a total length of two short-size containers 510 and 512 equals to a length of the long-size container. At this point, two short-size containers 510 and 512 may be connected with another type of lock devices at their length direction to combine into a long-size container.

In FIG. 5, lock types of lock devices 120 and 122 mounted at the corner position of the combined container may be of one type, while lock types of lock devices 520 and 522 mounted at the middle position of the combined container may be of a different type. With these embodiments, by dividing the lock devices into two groups based on the corner position and the middle position, lock devices in a single group may be of the same lock type and thus increase the accuracy in determining the lock type.

Referring back to a block of 320 in FIG. 3, a group of probability distributions may be determined based on the group of raw data. Here, a probability distribution in the group of probability distributions may be associated with a lock device in the group of lock devices and probabilities of lock types to which the lock device belongs. For example, the probability distribution 230 may be determined based on the raw data 220, and the probability distribution 232 may be determined based on the raw data 222. Specifically, the probability distribution 230 may be associated with the lock device 120 and probabilities of lock types to which the lock device 120 belongs. Hereinafter, more details about the probability distribution will be presented.

In some embodiments of the present disclosure, with respect to a given lock device in the group of lock devices, probabilities of lock types to which the given lock device belongs may be determined based on given raw data associated with the given lock device in the group of raw data. Then, a probability distribution in the group of probability distribution may be obtained based on the determined probabilities. Here, each lock device may have a corresponding probability distribution, which represents probabilities of lock types to which the lock device may possibly belong.

Figure 6:
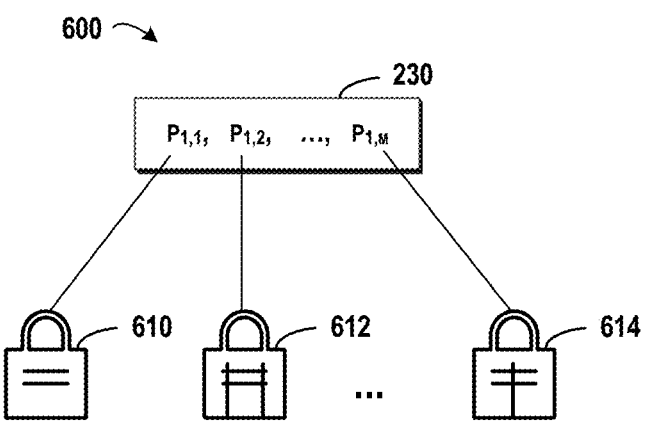
FIG. 6 illustrates a schematic diagram for a data structure of a probability distribution in accordance with embodiments of the present disclosure.

FIG. 6 illustrates a schematic diagram 600 for a data structure of the probability distribution 230 in accordance with embodiments of the present disclosure. As mentioned in the preceding paragraphs, the lock device 120 may belong to any of the plurality of lock types: Type 1, Type 2, . . . , and Type m (represented by reference numbers 610, 612, . . . , and 614). The probability distribution 230 is represented as a vector $(p_{1,1}, p_{1,2}, \ldots, p_{1,m})$, where each of the values in the vector may indicate a probability associated with one lock type. For example, the first value $p_{1,1}$ may represent a probability where the lock device 120 belongs to the Type 1.

Generally, the probability distribution for the lock device j may be represented in a more common way as $(p_{j,1}, p_{j,2}, \ldots, p_{j,m})$, where the value $p_{j,1}$ may represent a probability where the lock device j belongs to the Type 1, the value $p_{j,2}$ may represent a probability where the lock device j belongs to the Type 2, . . . , and the value $p_{j,m}$ may represent a probability where the lock device j belongs to the Type m. With these embodiments, the group of probability distributions may provide a reliable ground for determining the lock type to which the lock device belongs.

In some embodiments of the present disclosure, with respect to a given lock type in the lock types, a probability of the given lock type may be determined based on an image recognition procedure based on the given raw data. For example, the image data of the lock device 120 may be analyzed to recognize the content of the image. The image recognition procedure may indicate whether the lock device belongs to a given lock type by a probability between 0 and 1. For example, if the raw data 220 of the lock device 120 is input, the image recognition procedure may output the probabilities for Type 1, Type 2, . . . , and Type m as: $p_{1,1}, p_{1,2}, \ldots, p_{1,m}$. Therefore, the probability distribution 230 may be represented as $(p_{1,1}, \ldots, p_{1,2}, \ldots, p_{1,m})$.

Generally, if the raw data of the lock device j is input, the image recognition procedure may output the probability distribution $(p_{j,1}, p_{j,2}, \ldots, p_{j,m})$. Continuing the above example where four lock devices are included in the group, the image recognition procedure may provide a group of probability distributions $(p_{j,1}, p_{j,2}, \ldots, p_{j,m})$, where j=1 to 4. Various techniques have been developed for image recognition and details will be omitted hereinafter.

In some embodiments of the present disclosure, a probability of the given lock type may be determined based on a machine learning procedure with the given raw data. Nowadays, the machine learning technique plays important roles in image processing, and thus the probability of the lock type may be output from a well-trained machine learning model. Various techniques have been developed for training the machine learning model and details will be omitted hereinafter.

Referring back to FIG. 7, at a block of 330, a lock type of the lock device in the group of lock devices is determined based on the group of probability distributions. With these embodiments, the lock type of the lock device may be determined in an automatic way based on raw data collected from a group of sensors without manual intervention, and thus performance and accuracy may be greatly increased compared with human operations. Further, as a container object is usually locked with the same type of lock devices, determining the lock type based on a group of raw data of a group of lock devices may eliminate the potential error caused by deformation and erosion of the lock devices.

Figure 7:
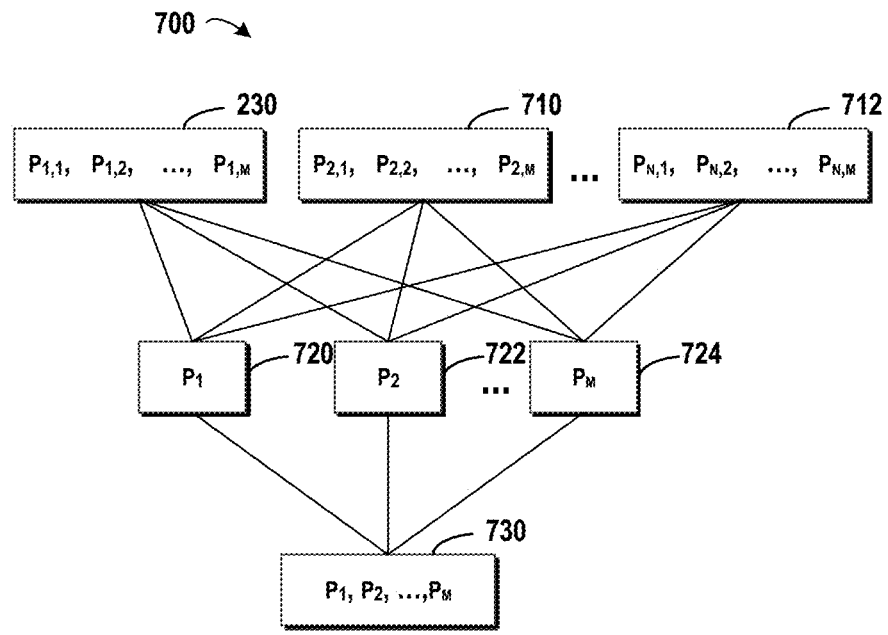
FIG. 7 illustrates a schematic diagram for generating a probability list in accordance with embodiments of the present disclosure.

In some embodiments of the present disclosure, in order to determine the lock type of the lock device, a probability list may be generated based on a comparison between values in the group of probability distributions that are associated with a target lock type and values in the group of probability distributions that are associated with the plurality of lock types. Reference will be made to FIG. 7 for generating the probability list.

FIG. 7 illustrates a schematic diagram 700 for generating a probability list 730 in accordance with embodiments of the present disclosure. In FIG. 7, a group of probability distributions 230, 710, . . . , and 712 may be determined according to steps described in the block 320. Further, these probability distributions 230, 710, . . . , and 712 may be used for determining members 720, 722, . . . , and 724 in the probability list 730. In one example, values in the group of probability distributions that are associated with a target lock type may be compared with values in the group of probability distributions that are associated with the plurality of lock types. Here, the target lock type may be any of the lock types and solutions such as the Bayes theorem may be utilized in for the comparison.

In one example, in order to determine a member associated with the lock Type i, the following Formula 1 may be used:

$$P_i = \frac{\Pi_{j=1}^n p_{j,i}}{\sum_{k=1}^m \left(\Pi_{j=1}^n p_{j,k}\right)} \qquad \text{Formula 1}$$

In Formula 1, $P_i$ represents a probability where the group of lock devices belong to Type i, m represents the number of the lock types, n represents the number of the lock devices in the group, $P_{j,i}$ represents a probability where the Lock j belongs to the Type i. The numerator in the above formula relates to values in the group of probability distributions that are associated with the target lock Type i, and the denominator relates to values in the group of probability distributions that are associated with the plurality of lock types (Type 1, Type 2, . . . , and Type m). It is to be understood that the above Formula 1 is only an example formula for determining a probability in the probability list. In other embodiments of the present disclosure, other formulas may be adopted as along as the formulas may reflect a candidate type of the group of lock devices. For example, the operator Π may be replaced with the operator Σ.

Further, the lock type of the lock device may be determined based on the generated probability list 730. Specifically, a highest probability may be selected for determining the lock type of the group of lock devices. In some embodiments of the present disclosure, if the highest probability in the probability list 730 is above a predefined threshold, the lock type of the lock device may be determined as a lock type corresponding to the highest probability. For example, the probability list 730 may be represented as $(P_1, P_2, \ldots, P_m)$. If the first member $P_1$ is the greatest value being above the threshold, then the lock type may be determined as Type 1. In another example, if the $i^{th}$ member $P_i$ is the greatest value, then the lock type may be determined as Type i. Here, the threshold may be determined in advance for representing a reliable standard. If the highest probability is above the threshold, it may indicate that the lock type corresponding to the highest probability is reliable and acceptable, otherwise the lock type corresponding to the highest probability may be discarded. In these embodiments, only reliable lock type may be output for further control the robot system to remove the lock device.

In some embodiments of the present disclosure, if the greatest probability in the probability list 730 is below a predefined threshold, an alarm may be provided for indicating a potential error. With these embodiments, unreliable lock type may be prevented from being output. Next, the above method may be restarted for another round of lock type determination until a reliable lock type is determined.

Figure 8:
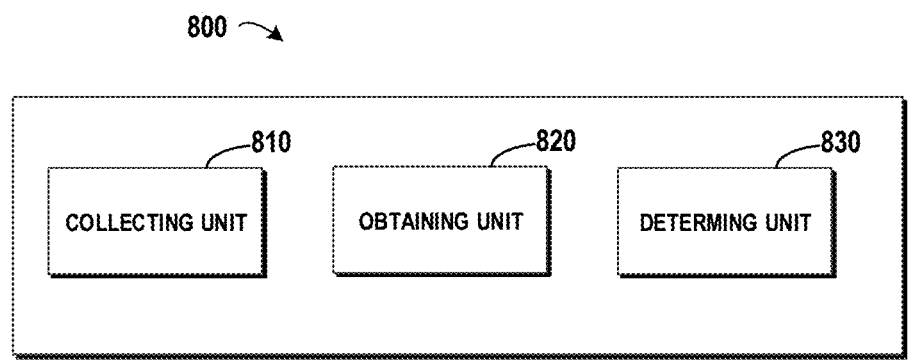
FIG. 8 illustrates a schematic diagram of an apparatus for determining a lock type in accordance with embodiments of the present disclosure.

In some embodiments of the present disclosure, an apparatus 800 for determining a lock type of a lock device is provided. FIG. 8 illustrates a schematic diagram of an apparatus 800 for determining a lock type in accordance with embodiments of the present disclosure. As illustrated in FIG. 8, the apparatus 800 may comprise: a collecting unit 810 configured to collect a group of raw data of a group of lock devices from a group of sensors respectively, the group of lock devices being respectively mounted to an object at a group of positions, the group of lock devices belonging to at least one lock type of a plurality of lock types; an obtaining unit 820 configured to obtain a group of probability distributions based on the group of raw data, a probability distribution in the group of probability distributions being associated with a lock device in the group of lock devices and probabilities of lock types to which the lock device belongs; and a determining unit 830 configured to determine a lock type of the lock device based on the group of probability distributions.

In some embodiments of the present disclosure, the obtaining unit 820 is further configured to: with respect to a given lock device in the group of lock devices, determine, based on given raw data associated with the given lock device in the group of raw data, probabilities of lock types to which the given lock device belongs; and obtain a probability distribution in the group of probability distribution based on the determined probabilities.

In some embodiments of the present disclosure, the obtaining unit 820 is further configured to: with respect to a given lock type in the lock types, determine a probability of the given lock type based on any of: an image recognition procedure based on the given raw data; and a machine learning procedure based on the given raw data.

In some embodiments of the present disclosure, the determining unit 830 is further configured to: generate a probability list based on a comparison between values in the group of probability distributions that are associated with a target lock type and values in the group of probability distributions that are associated with the plurality of lock types; and determine the lock type of the lock device based on the generated probability list.

In some embodiments of the present disclosure, the determining unit 830 is further configured to: in response to a highest probability in the probability list being above a predefined threshold, identify the lock type of the lock device as a lock type corresponding to the highest probability; and in response to the highest probability in the probability list being below a predefined threshold, provide an alarm for indicating a potential error.

In some embodiments of the present disclosure, the apparatus 800 further comprises: a selecting unit configured to select the group of lock devices from a plurality of lock devices that are mounted to the object based on relative positions between the plurality of lock devices and the object.

In some embodiments of the present disclosure, the relative positions comprise at least one of a corner position and a middle position.

In some embodiments of the present disclosure, the lock device comprises a twist lock and the object comprises a container, and the apparatus 830 further comprises: an instructing unit configured to instruct a robot system to remove the lock device from the object based on the type of the lock device.

In some embodiments of the present disclosure, a sensor in the group of sensors comprises a dimension measurement camera, and the raw data comprises dimension data of the lock device.

In some embodiments of the present disclosure, a sensor in the group of sensors comprises an image measurement camera, and the raw data comprises image data of the lock device.

Figure 9:
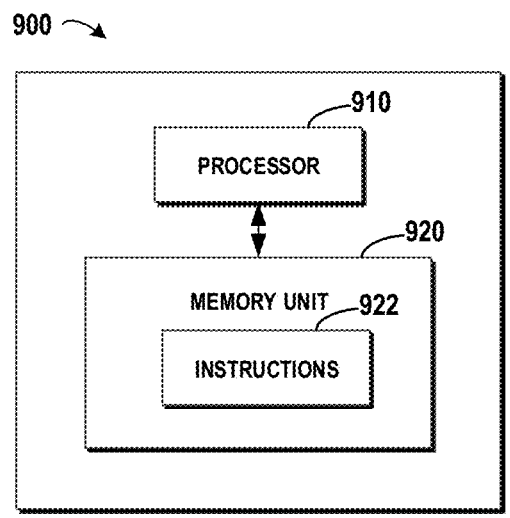
FIG. 9 illustrates a schematic diagram of a computer system for determining a lock type in accordance with embodiments of the present disclosure.

In some embodiments of the present disclosure, a system 900 for determining a lock type is provided. FIG. 9 illustrates a schematic diagram of a computer system 900 for determining a lock type in accordance with embodiments of the present disclosure. As illustrated in FIG. 9, the system 900 may comprise a computer processor 910 coupled to a computer-readable memory unit 920, and the memory unit 920 comprises instructions 922. When executed by the computer processor 910, the instructions 922 may implement the method for determining a lock type as described in the preceding paragraphs, and details will be omitted hereinafter.

In some embodiments of the present disclosure, a computer readable medium for determining a lock type of a lock device is provided. The computer readable medium has instructions stored thereon, and the instructions, when executed on at least one processor, may cause at least one processor to perform the method for determining a lock type of a lock device as described in the preceding paragraphs, and details will be omitted hereinafter.

Figure 10:
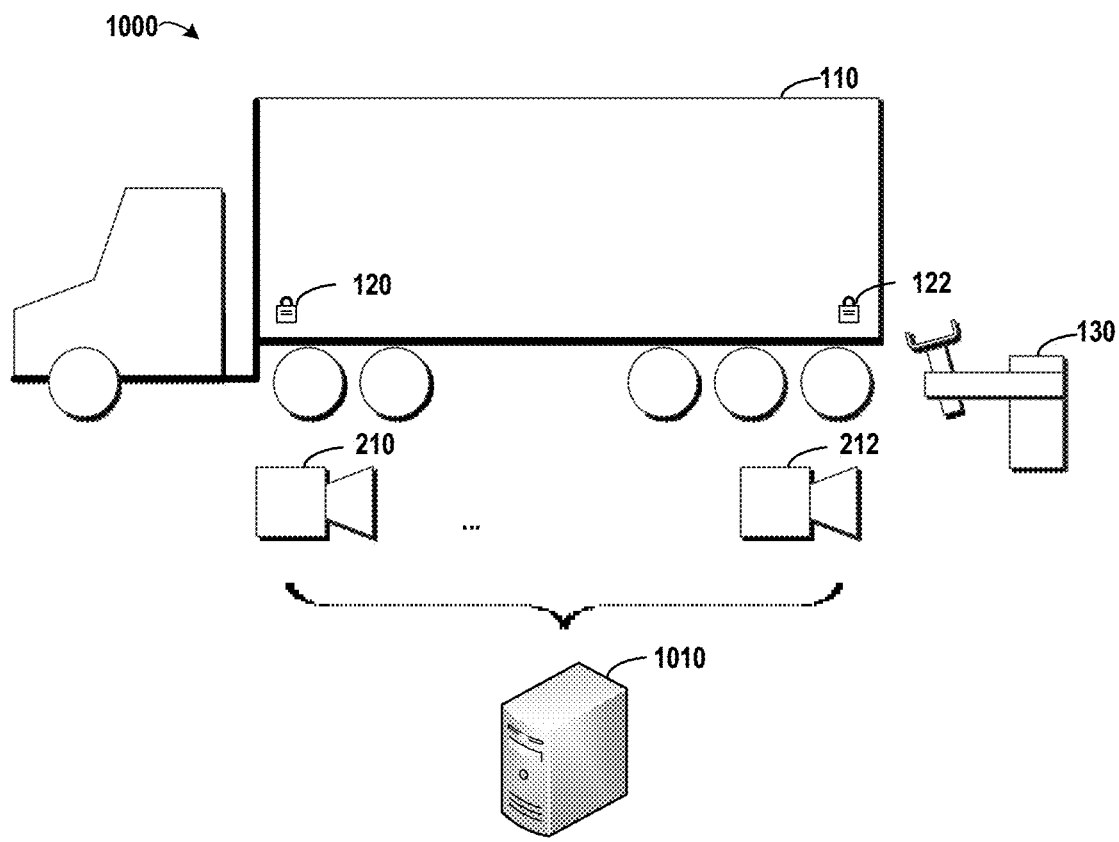
FIG. 10 illustrates a schematic diagram of a system for determining a lock type in accordance with embodiments of the present disclosure.

In some embodiments of the present disclosure, a system is provided for determining a lock type of a lock device. FIG. 10 illustrates a schematic diagram of a system 1000 for determining a lock type in accordance with embodiments of the present disclosure. The system 1000 comprises: a group of sensors 210, . . . , and 212 for collecting a group of raw data of a group of lock devices 120, . . . , and 122; and an computing system 1010 for determining a lock type of a lock device in the group of lock devices according to the present disclosure.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a lock type of a lock device, the method comprises:
   collecting, by a computing device, one or more images of a group of raw data of a group of lock devices from a group of sensors, respectively, the group of lock devices being respectively mounted to an object at a group of positions, and the group of lock devices belonging to at least one lock type of a plurality of lock types;
   determining, by the computing device, a group of raw data based on the one or more images;
   obtaining, by the computing device, a group of probability distributions based on the group of raw data, a probability distribution in the group of probability distributions being associated with a lock device in the group of lock devices and probabilities of lock types to which the lock device belongs; and
   determining, by the computing device, a lock type of the lock device based on the group of probability distributions;
   wherein, with respect to a given lock device, obtaining the group of probability distributions based on the group of raw data comprises:
      determining, by the computing device and based on a given raw data associated with the given lock device in the group of raw data, probabilities of lock types to which the given lock device belongs; and
      obtaining, by the computing device, a probability distribution in the group of probability distributions associated with the given lock device based on the probabilities of lock types as determined.

2. The method of claim 1, wherein determining the probabilities of the lock types comprises: with respect to a given lock type in the lock types, determining a probability of the given lock type based on any of:
   an image recognition procedure based on the given raw data; and
   a machine learning procedure based on the given raw data.

3. The method of claim 1, wherein determining the lock type of the lock device comprises:
   generating a probability list based on a comparison between values in the group of probability distributions that are associated with a target lock type and values in the group of probability distributions that are associated with the plurality of lock types; and
   determining the lock type of the lock device based on the generated probability list.

4. The method of claim 3, wherein determining the lock type of the lock device based on the generated probability list comprises:
   in response to a highest probability in the probability list being above a predefined threshold, identifying the lock type of the lock device as a lock type corresponding to the highest probability; and wherein the method further comprises: in response to the highest probability in the probability list being below a predefined threshold, providing an alarm for indicating a potential error.

5. The method of claim 1, further comprising:
selecting the group of lock devices from a plurality of lock devices that are mounted to the object based on relative positions between the plurality of lock devices and the object.

6. The method of claim 5, wherein the relative positions comprise at least one of a corner position and a middle position.

7. The method of claim 1, wherein the lock device comprises a twist lock and the object comprises a container, and the method further comprises:
instructing a robot system to remove the lock device from the object based on the lock type of the lock device.

8. The method of claim 1, wherein a sensor in the group of sensors comprises a dimension measurement camera, and the group of raw data comprises dimension data of the lock device.

9. The method of claim 1, wherein a sensor in the group of sensors comprises an image measurement camera, and the group of raw data comprises image data of the lock device.

10. An apparatus for determining a lock type of a lock device, the apparatus comprises:
a computing device comprising:
a processor;
a memory comprising a non-transitory computer readable media having stored therein instructions comprising a collecting unit, an obtaining unit, and a determining unit, the instructions being executable by the processor to perform operations comprising;
collect, by the collecting unit, one or more images of a group of lock devices from a group of sensors respectively, the group of lock devices being respectively mounted to an object at a group of positions, and the group of lock devices belonging to at least one lock type of a plurality of lock types;
obtain, by the obtaining unit, a group of probability distributions based on a group of raw data based on the one or more images, a probability distribution in the group of probability distributions being associated with a lock device in the group of lock devices and probabilities of lock types to which the lock device belongs; and
determine, by the determining unit, a lock type of the lock device based on the group of probability distributions;
wherein, with respect to a given lock device in the group of lock devices, obtaining the group of probability distributions based on a point cloud data and the group of raw data comprises:
determine, by the determining unit and based on given raw data associated with the given lock device in the group of raw data, probabilities of lock types to which the given lock device belongs; and
obtain, by the obtaining unit, a probability distribution in the group of probability distributions associated with the given lock device based on the probabilities of lock types as determined.

11. The apparatus of claim 10, wherein the processor further performs operations comprising:
determine, by the obtaining unit and with respect to a given lock type in the lock types, a probability of the given lock type based on any of:
an image recognition procedure based on the given raw data; and
a machine learning procedure based on the given raw data.

12. The apparatus of claim 10, wherein the processor further performs operations comprising:
generate, by the determining unit, a probability list based on a comparison between values in the group of probability distributions that are associated with a target lock type and values in the group of probability distributions that are associated with the plurality of lock types; and
determine, by the determining unit, the lock type of the lock device based on the generated probability list.

13. The apparatus of claim 12, wherein the processor further performs operations comprising:
in response to a highest probability in the probability list being above a predefined threshold, identify, by the determining unit, the lock type of the lock device as a lock type corresponding to the highest probability; and
in response to the highest probability in the probability list being below a predefined threshold, provide, by the determining unit, an alarm for indicating a potential error.

14. The apparatus of claim 10, wherein the instructions further comprising a selecting unit, and the processor further performs operations comprising:
select, by the selecting unit, the group of lock devices from a plurality of lock devices that are mounted to the object based on relative positions between the plurality of lock devices and the object.

15. The apparatus of claim 14, wherein the relative positions comprise at least one of a corner position and a middle position.

16. The apparatus of claim 10, wherein the lock device comprises a twist lock and the object comprises a container, the instructions further comprising an instructing unit, and the processor further performs operations comprising:
instruct, by the instructing unit, a robot system to remove the lock device from the object based on the lock type of the lock device.

17. The apparatus of claim 10, wherein a sensor in the group of sensors comprises a dimension measurement camera, and the group of raw data comprises dimension data of the lock device.

18. The apparatus of claim 10, wherein a sensor in the group of sensors comprises an image measurement camera, and the group of raw data comprises image data of the lock device.

19. A computer system for determining a lock type of a lock device, comprising: a computer processor coupled to a non-transitory computer-readable memory unit, the memory unit comprising instructions that when executed by the computer processor implements the method according to claim 1.

20. A non-transitory computer readable medium having instructions stored thereon, the instructions, when executed on at least one processor, cause the at least one processor to perform the method according to claim 1.

21. A system for determining a lock type of a lock device, comprising:
a group of sensors for collecting a group of raw data of a group of lock devices; and
a computer system for determining a lock type of a lock device in the group of lock devices according to claim 19.

* * * * *